(12) United States Patent
Wang

(10) Patent No.: US 9,874,878 B2
(45) Date of Patent: Jan. 23, 2018

(54) SYSTEM AND METHOD FOR ADAPTIVE MULTI-SCALE PERCEPTION

(71) Applicant: Sikorsky Aircraft Corporation, Stratford, CT (US)

(72) Inventor: Hongcheng Wang, Farmington, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 484 days.

(21) Appl. No.: 14/805,650

(22) Filed: Jul. 22, 2015

(65) Prior Publication Data

US 2017/0075359 A1    Mar. 16, 2017

Related U.S. Application Data

(60) Provisional application No. 62/027,325, filed on Jul. 22, 2014.

(51) Int. Cl.
| | |
|---|---|
| *G01J 5/02* | (2006.01) |
| *G05D 1/06* | (2006.01) |
| *G01C 21/00* | (2006.01) |
| *G01D 1/00* | (2006.01) |

(52) U.S. Cl.
CPC ........... *G05D 1/0676* (2013.01); *G01C 21/00* (2013.01)

(58) Field of Classification Search
CPC ......... G01J 5/02; G01D 1/042; G01D 1/0011; G01D 1/0202
USPC .......................................................... 701/10
See application file for complete search history.

(56) References Cited

U.S. PATENT DOCUMENTS

| | | | |
|---|---|---|---|
| 7,411,196 B2 | 8/2008 | Kalayeh | |
| 7,970,507 B2 | 6/2011 | Fregene et al. | |
| 2004/0167709 A1* | 8/2004 | Smitherman | G01C 11/02 701/409 |

* cited by examiner

*Primary Examiner* — Tan Q Nguyen
(74) *Attorney, Agent, or Firm* — Cantor Colburn LLP

(57) ABSTRACT

A system and method of adaptive multi-scale perception of a target for an aircraft, includes receiving sensor signals indicative of aircraft information with respect to the target; selecting one or more sensor devices in response to the receiving of the aircraft information; receiving sensor information from the one or more sensor devices indicative of the target; dynamically selecting sensor processing parameters for the one or more sensor devices; and analyzing the sensor information from the selected sensor devices and using the selected sensor processing parameters.

15 Claims, 3 Drawing Sheets

SYSTEM AND METHOD FOR ADAPTIVE MULTI-SCALE PERCEPTION

CROSS-REFERENCE TO RELATED APPLICATIONS

This application claims the benefit of U.S. provisional patent application Ser. No. 62/027,325, filed Jul. 22, 2014, the entire contents of which are incorporated herein by reference.

BACKGROUND

The subject matter disclosed herein relates generally to the field of unmanned aerial vehicles and, more particularly, to an adaptive multi-scale perception system and method for autonomous landing of an unmanned aerial vehicle.

Description of Related Art

Unmanned aerial vehicles (UAVs), for example, fixed-wing and rotorcraft UAVs, are powered aircraft without a human operator. As such, UAVs provide advantages over manned aircraft by removing humans from situations which may be deemed dangerous, for example, during reconnaissance or during search and rescue operations during a natural disaster. Autonomous UAVs are a natural extension of UAVs and do not require real-time control by a human operator. Autonomous UAVs may be required to land on an unprepared site or unknown terrain without human assistance during mission operation or in an emergency, must be able to autonomously select a desirable landing site, or must be able to autonomously identify and classify objects on the ground in order to be a viable and effective option in flight operations.

Current art on autonomous landing and object identification in autonomous vehicles has focused on three-dimension (3D) sensors, e.g., LIght Detection And Ranging scanners (LIDAR) and video sensors to sense the 3D environment and terrain types and to identify terrain semantics for target identification or safe landing area detection. As these conventional systems acquire data by using the same sensors throughout the perception process, limitations in perception range and resolution of sensors create an unnecessary waste of storage space, communication bandwidth, and processing power. Also, conventional systems use the same parameters, regardless of altitude or scale, in perception algorithm to process the acquired sensor data. As a result, the algorithms are not robust to scale change and appearance variations, for example, region segmentation, or semantic classification. Additionally, conventional systems using a single LIDAR approach are not able to discriminate a soft ground surface over a surface that can provide load bearing capability or small foreign objects in the aircrafts path while approaching a landing site

BRIEF SUMMARY

According to an aspect of the invention, a method of adaptive multi-scale perception of a target for an aircraft, includes receiving, with a processor, sensor signals indicative of aircraft information with respect to the target; selecting, with the processor, one or more sensor devices in response to the receiving of the aircraft information; receiving, with the processor, sensor information from the one or more sensor devices indicative of the target; dynamically selecting, with the processor, sensor processing parameters for the one or more sensor devices; and analyzing, with the processor, the sensor information from the selected sensor devices and using the selected sensor processing parameters.

In addition to one or more of the features described above or as an alternative, further embodiments could include receiving at least one of an altitude or distance of the aircraft in relation to the target, and weather information for the aircraft during flight.

In addition to one or more of the features described above or as an alternative, further embodiments could include receiving the sensor information from one or more of a long range sensor device, a medium range sensor device, a short range sensor device, and a ground level sensor device.

In addition to one or more of the features described above or as an alternative, further embodiments could include classifying the sensor information as a function of rough scale and fine scale.

In addition to one or more of the features described above or as an alternative, further embodiments could include segmenting the sensor information into additional segments as a function of features of the sensor device.

In addition to one or more of the features described above or as an alternative, further embodiments could include classifying the segments into semantic classes.

In addition to one or more of the features described above or as an alternative, further embodiments could include identifying a target based on the sensor information.

In addition to one or more of the features described above or as an alternative, further embodiments could include selecting the sensor device as a function of a perception range of the sensor device to the target.

In addition to one or more of the features described above or as an alternative, further embodiments could include selecting the sensor device as a function of weather conditions.

According to another aspect of the invention, a system for adaptive multi-scale perception of a target for an aircraft with a processor; and memory having instructions stored thereon that, when executed by the processor, cause the system to: receive sensor signals indicative of aircraft information with respect to the target; dynamically select one or more sensor devices in response to the receiving of the aircraft information; receive sensor information from the one or more sensor devices indicative of the target; dynamically select sensor processing parameters for the one or more sensor devices; analyze the sensor information from the selected sensor devices and use the selected sensor processing parameters.

In addition to one or more of the features described above or as an alternative, further embodiments could include a processor that is configured to receive at least one of an altitude or distance of the aircraft in relation to the target, and weather information for the aircraft during flight.

In addition to one or more of the features described above or as an alternative, further embodiments could include a processor that is configured to receive the sensor information from one or more of a long range sensor device, medium range sensor device, short range sensor device, and a ground level sensor device.

In addition to one or more of the features described above or as an alternative, further embodiments could include a processor that is configured to classify the sensor information as a function of rough scale and fine scale.

In addition to one or more of the features described above or as an alternative, further embodiments could include a processor that is configured to segment the sensor information into additional segments as a function of features of the sensor device.

In addition to one or more of the features described above or as an alternative, further embodiments could include a processor that is configured to classify the segments into semantic classes.

In addition to one or more of the features described above or as an alternative, further embodiments could include a processor that is configured to identify a target based on the sensor information.

In addition to one or more of the features described above or as an alternative, further embodiments could include a processor that is configured to select the sensor device as a function of a perception range of the sensor device to the target.

Technical function of aspects of the invention above include landing zone detection and object identification through efficient and selective storage and adaptive processing of sensor data with robust perception algorithms that use altitude adaptive sensors and parameters and weather adaptive sensor selection.

Other aspects, features, and techniques of the invention will become more apparent from the following description taken in conjunction with the drawings.

BRIEF DESCRIPTION OF THE SEVERAL VIEWS OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which like elements are numbered alike in the several FIGURES:

DETAILED DESCRIPTION

Embodiments include a system and method that can be used for landing zone detection and object recognition applications. The system and method includes an adaptive perception system and adaptive parameter selection using a multi-scale perception system for a robust perception algorithm.

Figure 1:
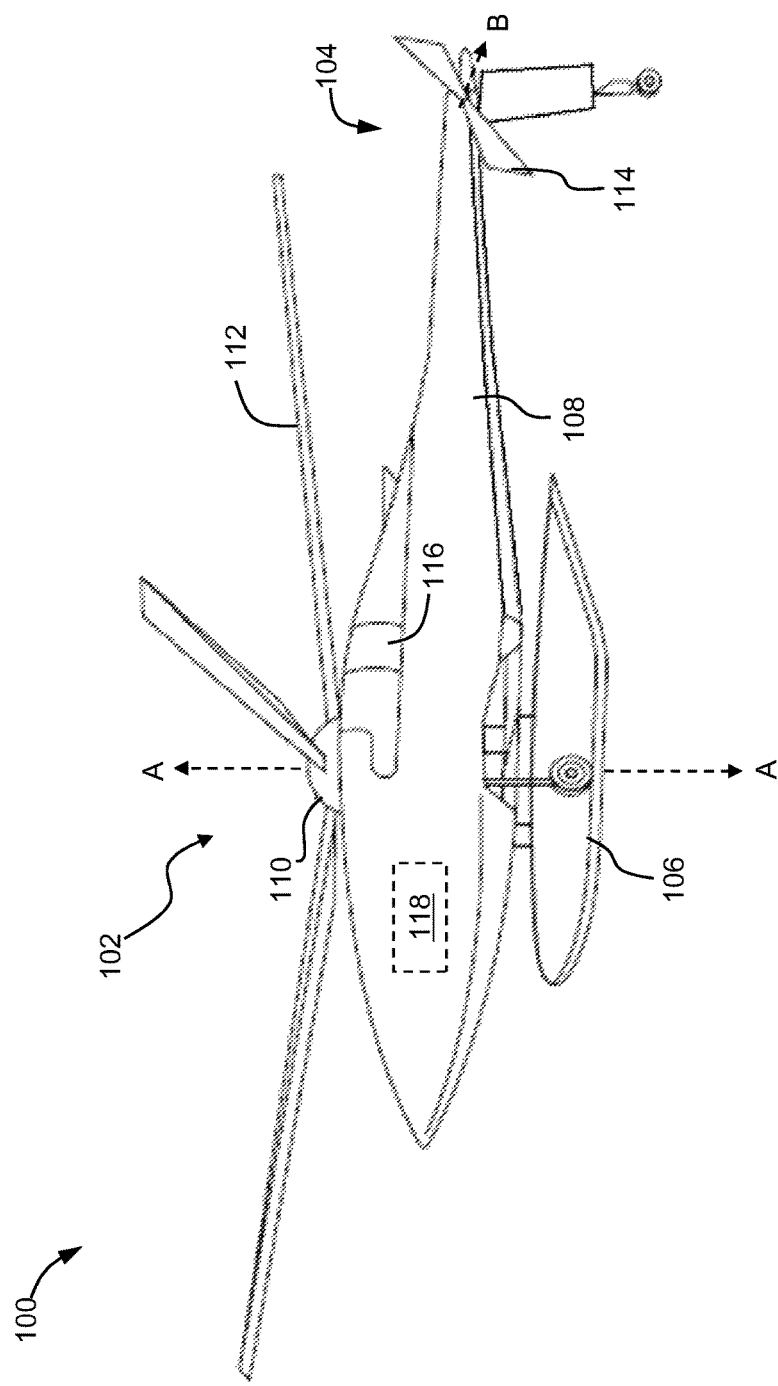
FIG. 1 is a perspective view of an exemplary rotary wing UAV aircraft according to an embodiment of the invention.

Referring now to the drawings, FIG. 1 illustrates a perspective of an exemplary vehicle in the form of an autonomous rotary-wing unmanned aerial vehicle (UAV) 100 (or "autonomous UAV 100") for implementing a perception algorithm according to an embodiment of the invention. As illustrated, autonomous UAV 100 includes a main rotor system 102, an anti-torque system, for example, a tail rotor system 104, and a multi-scale perception system 106. Main rotor system 102 is attached to airframe 108 and includes a rotor hub 110 having a plurality of blades 112 that rotate about axis A. Also, tail rotor system 104 is attached aft of main rotor system 102 and includes a plurality of blades 114 that rotate about axis B (which is orthogonal to axis A). Main rotor system 102 and tail rotor system 104 are driven to rotate about their respective axes A, B by one or more turbine engines 116 through gearboxes (not shown). Although a particular configuration of an autonomous UAV 100 is illustrated as a rotary wing UAV and described in the disclosed embodiments, it will be appreciated that other configurations and/or machines include autonomous and semi-autonomous optionally-piloted vehicles that may operate in land or water including fixed-wing aircraft, rotary-wing aircraft, marine vessels (e.g., submarines, ships, etc.), and land vehicles (e.g., trucks, cars, etc.) may also benefit from embodiments disclosed.

Perception system 106 includes sensors associated with a sensing system having one or more sensor devices that acquire sensor data on a target for processing by aircraft computer 118. A target can include a terrain, an object, a landing area, or the like. Aircraft computer 118 processes acquired sensor data in order to determine, in some examples, candidate landing areas, object identification, tracking, landing area detection, or the like. Perception system 106 with its sensors captures data from a terrain or target for processing by aircraft computer 118 through perception algorithm while autonomous UAV 100 is airborne or at ground level. While perception system 106 is shown attached proximate to body landing gear of autonomous UAV 100, it will be appreciated that sensors associated with perception system 106 can be positioned at different locations and orientations on autonomous UAV 100 such as, e.g., at a nose of autonomous UAV 100, at a tail of autonomous UAV 100, or at one or more locations near the body and tail landing gears.

In an embodiment, perception system 106 may include a plurality of sensor devices in its sensing system that provide rough scale- and fine scale-perception of targets, e.g., objects and/or terrain, at different altitudes and which leverage capabilities of the plurality of image acquisition devices with respect to weather conditions, device range, and device resolution. Also, the plurality of sensor devices for perception system 106 can also be selected based on the requirements of mission goals and objectives. Typically, if the perception range of the sensor device is longer, then the resolution of the acquired data is lower, i.e., less detectable for small objects. In some non-limiting examples, multi-scale perception system 106 can include long-range sensor devices with a perception range of several miles such as, e.g., 3D RAdio Detection And Ranging (RADAR) and telescope cameras; medium range perception devices with a perception range from about 10 meters to about 1000 meters such as, e.g., pan-tilt-zoom (PTZ) cameras, single visible or infrared cameras, and medium range LIDAR, e.g., RIEGL VQ®-580 available from RIEGL®; short range perception devices with a perception range of less than 1 meter such as, for example, short-range LIDAR, e.g., High Definition LiDAR™ HDL-32E available from Velodyne®, or stereo cameras; and ground level perception such as, e.g., soil sensors for estimating load bearing capability of terrain.

Aircraft computer 118 processes, in one non-limiting embodiment, information acquired through the various sensors associated with multi-scale perception system 106 based on the altitude of autonomous UAV 100 or distance to a target (i.e., altitude adaptive) in order to implement perception algorithm and make a decision on the target or location. Optionally, aircraft computer 118 can select acquisition sensor device to acquire sensor information based on weather conditions (i.e., weather adaptive) at the time. For example, in inclement weather like snow, fog, or rain, short-range infrared (SWIR) or millimeter-wave sensor devices, e.g., millimeter wave synthetic aperture radar (SAR) can be used for long-range sensing. Alternatively, or in addition to weather conditions, sensor information related to range, resolution, and location of sensor devices associated with perception can be used for selecting a particular sensor device in perception system for acquiring sensor information. In some embodiments, data acquired from two or more sensor devices may be fused together for more robust estimation, e.g., LIDAR and stereo camera. Additionally, autonomous UAV 100 may include an inertial navigation unit such as, e.g., an inertial measurement Unit (IMU) that may be used to acquire position data related to a current rotation and acceleration of autonomous UAV 100 in order to determine a geographic location of autonomous UAV 100 including a change from its initial position. Additional navigation systems such as GPS or the like may be provided for a rough estimation in the coarse scale prior to using sensors associated with long-range, medium range, and short range sensor devices of perception system 106.

Figure 2:
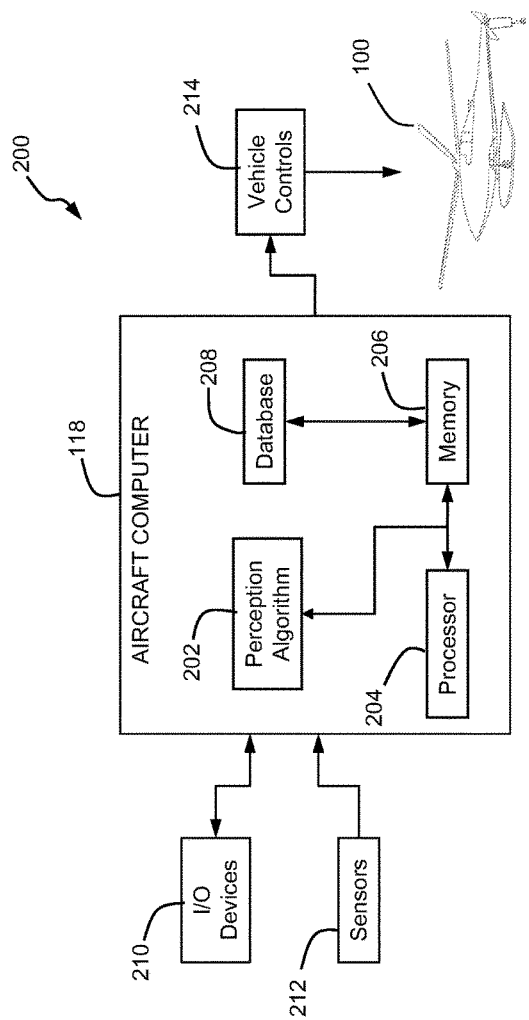
FIG. 2 is a schematic view of an exemplary computing system according to an embodiment of the invention.

FIG. 2 illustrates a schematic block diagram of system 200 on board autonomous UAV 100 according to an exemplary embodiment. As illustrated, system 200 includes aircraft computer 118 that executes instructions for implementing perception algorithm 202. Aircraft computer 118 receives raw sensor data on a landing area or target from one or more sensors 212 that are associated with perception system 106 (FIG. 1). Computer 118 includes a memory 206 that communicates with a processor 204. Memory 206 may store perception algorithm 202 as executable instructions that are executed by processor 204. Perception algorithm 202 can include additional algorithms that are stored as executable instructions for implementing embodiments of the invention described herein. The instructions may be stored or organized in any manner and at any level of abstraction, such as in connection with the execution of perception algorithm 202. Processor 204 may be any type of processor (such as a central processing unit (CPU) or a graphics processing unit (GPU)), including a general purpose processor, a digital signal processor, a microcontroller, an application specific integrated circuit, a field programmable gate array, or the like. In an embodiment, processor 204 may include an image processor in order to receive images and process the associated image data using one or more processing algorithms to produce one or more processed signals. Also, in embodiments, memory 206 may include random access memory (RAM), read only memory (ROM), or other electronic, optical, magnetic, or any other computer readable medium onto which is stored the mixing algorithm described below.

System 200 may include a database 208. Database 208 can be used to store inertial navigational data that may be acquired by IMU including operating conditions of the autonomous UAV 100 such as, for example, lateral acceleration, attitude, angular rate, and magnitude and direction of wind speed relative to autonomous UAV 100. Also, sensor data acquired on a landing zone or target and/or any feature data from reference images that may be used by perception algorithm 202 may be stored in database 208. The data stored in database 208 may be based on one or more other algorithms or processes for implementing perception algorithm 202. Database 208 may be used for any number of reasons. For example, database 208 may be used to temporarily or permanently store data, to provide a record or log of the data stored therein for subsequent examination or analysis, etc. In some embodiments, database 208 may store a relationship between data, such as one or more links between data or sets of data acquired through the various sensor devices of perception system 106 (FIG. 1) on board autonomous UAV 100.

System 200 may provide one or more controls, such as vehicle controls 214. Vehicle controls 214 may provide directives based on, e.g., data associated with an internal navigation system such as the IMU. Directives provided by vehicle controls 214 may include navigating or repositioning autonomous UAV 100 to an alternate landing zone for evaluation as a suitable landing zone. The directives may be presented on one or more input/output (I/O) devices 210. I/O devices 210 may include a display device or screen, audio speakers, a graphical user interface (GUI), etc. In some embodiments, I/O devices 210 may be used to enter or adjust a linking between data or sets of data. It is to be appreciated that system 200 is illustrative. In some embodiments, additional components or entities not shown in FIG. 2 may be included. In some embodiments, one or more of the components or entities may be optional. In some embodiments, the components or entities of system 200 may be arranged or configured differently from what is shown in FIG. 2. For example, in some embodiments I/O device(s) 210 may be commanded by vehicle controls 214, as opposed to being commanded by processor 204 as shown in FIG. 2.

Figure 3:
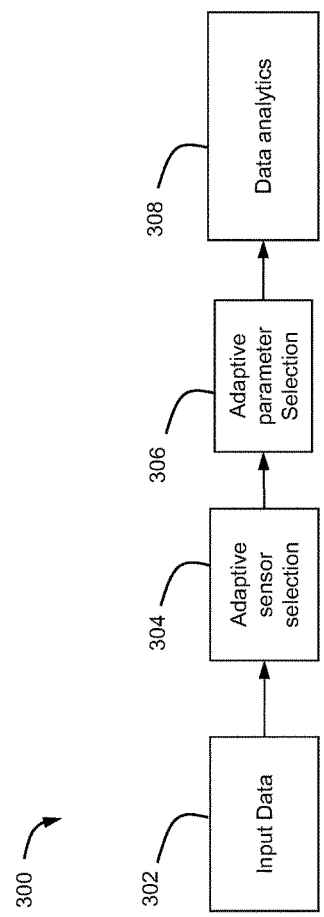
FIG. 3 illustrates a dataflow diagram of a multi-scale perception algorithm according to an embodiment of the invention.

FIG. 3 illustrates an exemplary data flow diagram 300 that is performed by processor 204 for implementing perception algorithm 202 according to an embodiment of the invention. Particularly, data flow diagram 300 implements a perception algorithm 202 with aircraft computer 118 that includes an altitude adaptive sensor- and parameter-selection aspect as well as a weather adaptive sensor selection aspect for using multi-scale sensor devices, and FIG. 2 is also referenced in the description of FIG. 3.

In 302, input data is received by processor 204 for selection of suitable sensor devices. Input data can include, e.g., information related to altitude of autonomous UAV 100 or distance of autonomous UAV 100 to target, weather information, e.g., snow, fog, or rain, and sensor parameters related to range, resolution, and location of sensor devices on board autonomous UAV 100. In 304, one or more sensor devices are selected for capturing sensor data based on the input data received in 302. For example, based on the altitude of autonomous UAV 100 or its distance to a target, different sensor devices and parameters will be used. In another example, weather conditions, such as snow, fog, or rain also determine the sensor device that is used. Additionally, as the altitude or distance or weather conditions change during a mission, utilization of sensor devices and parameters also change. In an example, if the perception range of the sensor device is longer, then the resolution of the acquired data is lower, i.e., less detectable for small objects. In some non-limiting examples, perception algorithm 202 will select from long-range sensor devices such as, e.g., 3D RADAR and telescope cameras; medium range perception devices such as, PTZ cameras, single visible or infrared cameras, and medium range LIDAR; short range perception devices such as, e.g., short-range LIDAR, or stereo cameras; and ground level sensor device such as, e.g., soil sensors. In addition to the sensor devices described above, or alternatively, perception algorithm 202 can select short range sensor device such as, e.g., SWIR, or long-range sensor device such as millimeter wave SAR in inclement weather conditions like fog, snow, or rain. Images of a landing area or target are captured and generated for processing by processor 204.

In 306, sensor parameters in perception algorithm 202 ("sensor processing parameters") are dynamically selectable based on altitude of autonomous UAV 100 or distance of autonomous UAV 100 to a target. For example, sensor processing parameters that are used in perception algorithm 202 are parameters related to algorithm 202 for processing sensor information. These sensor processing parameters can be dynamically changed and applied during information processing based on altitude and distance to a location or target. In 308, one or more analytics algorithms are applied to the received sensor data such as, e.g., image region segmentation and semantic classification for analyzing the sensor data and using the selected sensor processing parameters.

In an embodiment, an image region segmentation algorithm can be applied in order to identify a candidate landing area. Candidate landing areas are often identified by one sensor device (e.g., LIDAR), and then are further analyzed for semantics classification based on data from another sensor device (e.g. image camera). For example, in image region segmentation, an image of a candidate landing area can be further segmented into multiple regions in an image space. During segmentation, each image region for a landing zone candidate region is segmented into additional segments called superpixels based on visual features from a sensor device, e.g., such as a camera, or depth features from another sensor device, e.g., such as LIDAR. The visual features in an image in the super pixel segment are processed on a graph with vertices for pixels and edges between pixels. The segmentation criterion is adjusted based on the degrees of variability in neighboring regions of the image. In an example, a landing zone candidate region is segmented into one or more superpixel regions. The segmentation parameters, such as scale and minimum size of super pixels, are adaptively tuned based on contextual information of the autonomous UAV status such as, e.g., altitude. The parameters for regions segmentation, i.e., a scale parameter and a threshold parameter, are also adaptively changed with respect to altitude. At a rough scale, the images are usually not as sharp as those in a finer scale, and the objects of interests are usually small. Image region segmentation algorithm will use a smaller scale parameter and a smaller threshold parameter in region segmentation. At a finer scale, the focus is on larger regions such that the effects of small details in the image are ignored.

In another embodiment, a semantic classification algorithm can be applied whereby classifiers or models at different scale can be individually trained in order to categorize sensor data or information into semantic classes such as, for example, tree, road, sea, building, field, etc. Images as well as LIDAR, RADAR, etc. can be categorized through semantic classification algorithm. Some classification algorithms may include Random Forest (RF), Support Vector Machines (SVMs), or dictionary learning based approaches. The object classes of interest may also be different at different scales. For example, at a rough scale, classes of interest are city area, urban area, sea, desert, or the like. At a medium scale, classes of interest can be man-made structures, natural vegetation, water, etc. At a fine scale, classes of interest can be trees, grass, water, road, sand, building, etc. Correspondingly models/classifiers can be trained based on different classes and different training data.

Benefits of the embodiments of the invention described herein include efficient and selective storage and processing of sensor data adaptively, robust perception with altitude adaptive- sensor and parameter selection and weather-adaptive sensor selection for perception algorithms in landing zone detection and object recognition applications.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions or equivalent arrangement not hereto described will be apparent to those of ordinary skill in the art without departing from the scope and spirit of the invention. Additionally, while the various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method of adaptive multi-scale perception of a target for an aircraft, comprising:
   receiving, with a processor, sensor signals indicative of aircraft information with respect to the target;
   selecting, with the processor, one or more sensor devices in response to the receiving of the aircraft information;
   receiving, with the processor, sensor information from the one or more sensor devices indicative of the target;
   dynamically selecting, with the processor, sensor processing parameters for the one or more sensor devices based on at least one of aircraft altitude and distance to one of a location and a target; and
   analyzing, with the processor, the sensor information from the selected sensor devices and using the selected sensor processing parameters.

2. The method of claim 1, wherein the receiving of the aircraft information further comprises receiving at least one of an altitude or distance of the aircraft in relation to the target, and weather information for the aircraft during flight.

3. The method of claim 1, further comprising receiving the sensor information from one or more of a long range sensor device, a medium range sensor device, a short range sensor device, and a ground level sensor device.

4. The method of claim 1, further comprising classifying the sensor information as a function of rough scale and fine scale.

5. The method of claim 1, further comprising segmenting the sensor information into additional segments as a function of features of the sensor device.

6. The method of claim 5, further comprising classifying the segments into semantic classes.

7. The method of claim 1, further comprising identifying a target based on the sensor information.

8. The method of claim 1, further comprising selecting the sensor device as a function of a perception range of the sensor device to the target.

9. The method of claim 1, further comprising selecting the sensor device as a function of weather conditions.

10. A system for adaptive multi-scale perception of a target for an aircraft, comprising:
   a processor;
   one or more sensor devices including a long range sensor device, a medium range sensor device, a short range sensor device, and a ground level sensor device; and
   memory having instructions stored thereon that, when executed by the processor, cause the system to:
   receive sensor signals indicative of aircraft information with respect to the target;
   dynamically select the one or more sensor devices in response to the receiving of the aircraft information;
   receive sensor information from the one or more sensor devices indicative of the target;
   dynamically select sensor processing parameters for the one or more sensor devices based on at least one of aircraft altitude and distance to one of a location and a target; and
   analyze the sensor information from the selected sensor devices; and
   use the selected sensor processing parameters.

11. The system of claim 10, wherein the processor is configured to receive at least one of an altitude or distance of the aircraft in relation to the target, and weather information for the aircraft during flight.

12. The system of claim 10, wherein the processor is configured to classify the sensor information as a function of rough scale and fine scale.

13. The system of claim 10, wherein the processor is configured to segment the sensor information into additional segments as a function of features of the sensor device.

14. The system of claim 13, wherein the processor is configured to classify the segments into semantic classes.

15. The system of claim 10, wherein the processor is configured to identify a target based on the sensor information.

* * * * *